Nov. 6, 1928.                    1,690,196
N. A. HALLWOOD
SCALE
Filed June 7, 1927
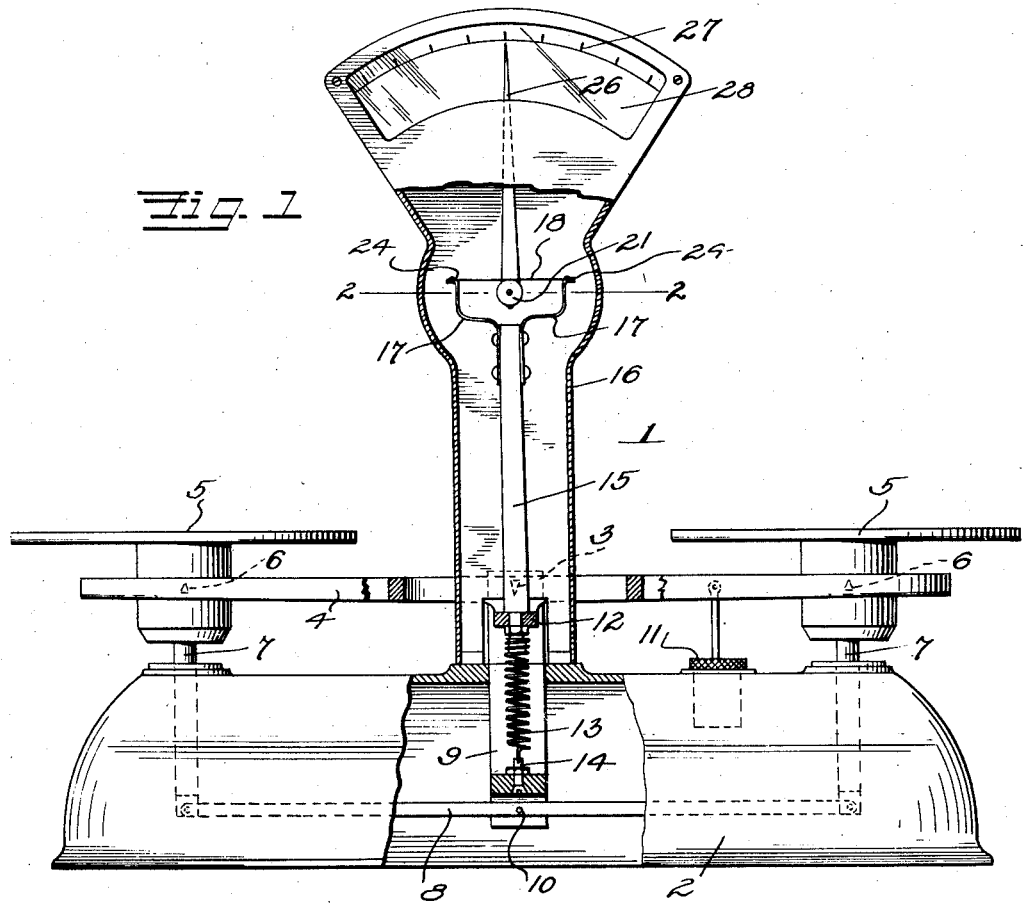

Patented Nov. 6, 1928.

1,690,196

UNITED STATES PATENT OFFICE.

NATHAN A. HALLWOOD, OF COLUMBUS, OHIO.

SCALE.

Application filed June 7, 1927. Serial No. 197,140.

This invention relates to improvements in scales, and is particularly directed to scales of the so called even balance type, wherein the beam member is pivoted centrally upon a supporting base, and is adapted to assume, when unweighted, a position of balance or equilibrium, and wherein indicating mechanism is provided for denoting the degree of deflection of the beam member to one side or the other of its normal position.

Among the objects of the invention are: To provide a scale of the type set forth wherein the movement of the indicating mechanism is multiplied to a desired extent with respect to the pivotal movement of the beam member; to reduce to a minimum the element of friction between the operating connections of the beam and indicating mechanism to the end of providing a scale of accurate and sensitive formation and yet of rugged and durable design, and in various other features of construction and operation which will be in part obvious and in part pointed out hereinafter.

For a further understanding of the invention reference is to be had to the following description and the accompanying drawing, wherein:

Figure 1 is a view in side elevation and partly in vertical section of a scale constructed in accordance with the present invention Figure 2 is a horizontal sectional view taken on the line 2—2 of Figure 1, Figure 3 is a vertical sectional view disclosing more particularly the relationship between the operating yoke and the drum of the indicating member, Figure 4 is a blank view of the flexible strap employed for connecting the yoke with the indicator drum.

Referring more particularly to the accompanying drawing, the numeral 1 designates my improved scale in its entirety. The scale is formed preferably to embody a base 2, which is in the form of an open bottomed hollow casting, and has the upper surface thereof provided centrally with a pair of spaced bearings for the reception of the knife edge trunnions 3 provided upon a beam member or lever 4. The trunnions 3 are situated in the center of equilibrium of the beam so that the latter will be perfectly balanced to permit of free oscillation on the part of the ends thereof. The outer ends of said lever are provided with weight receivers 5, which are pivotally mounted as usual upon the ends of said lever by means of the customary knife edge trunnions 6. The receivers 5 are provided with the usual depending stems 7, which are movably mounted in the base 2 and have their lower ends pivotally connected with a check rod 8. This check rod is mounted within the base and is pivotally connected with a saddle casting 9 as indicated at 10, the pivot 10 being disposed in vertical alignment with the knife edge trunnions 3. This construction is customary in even balanced scales and provides the usual weighing parallelogram. A dash pot structure 11 is carried by the base and may be connected with the beam so as to arrest or dampen undue vibratory movement thereof. The beam is provided centrally with a cross web 12, to which is connected at a point laterally offset with respect to the trunnions 3 the upper end of the coil spring 13, the lower end of the latter being connected as at 14 with the bottom of the saddle casting 9. The presence of the spring serves to return the beam to a normal position when the beam is equally weighted on opposite sides of the trunnions 3, and this construction has been more fully set forth in my co-pending application Serial Number 187,641 filed April 29, 1927.

In my aforesaid earlier application an elongated indicator arm is set forth as being connected with the central portion of the weighing beam and movable rigidly in unison therewith so that the free end of the arm will travel over a graduated surface, thereby indicating when the beam is deflected from its normal balanced position. It has been found, however, that in order to secure the requisite and desired travel on the part of the indicator arm it has been necessary to oscillate the beam to a very considerable extent in order to procure necessary travel of the indicator arm, or the latter must be of such length that the scale would be out of proportion. Therefore, the present invention provides an improvement upon the structure set forth in my earlier application by providing for multiplied movement on the part of the indicator arm with respect to the increments of travel of the beam and, moreover, to accomplish this result in a simple practicable and efficient manner wherein friction losses are reduced to a minimum and at the same time an exceedingly durable construction produced.

In the attainment of these ends the web 12 of the beam is provided in this instance with an upstanding normally vertically disposed arm 15 which oscillates unitarily and rigidly with the beam, the said arm being disposed in a stationary tower or indicator casing 16. Connected with the upper end of the arm 15 is a pair of spaced metallic resilient fingers 17, which are shaped to constitute a yoke, the upper or outer ends of which possessing such resiliency that the normal tendency thereof is to separate or spring apart. Connected with the outer ends of the fingers 17 is a metallic strap 18 of fine gauge material. This strap is shown more particularly in Figure 4, wherein it will be noted that the strap embodies an enlarged body portion provided with an elongated slot 19, the enlarged body portion terminating in a reduced relatively thin extremity 20. This strap is wrapped circularly at its intermediate portion about the outer circumference of an indicator drum 21, and is positively secured to said drum by a fastening pin 22, which passes through an opening 23 provided in the strap. It will be seen that by passing the thin extremity 20 of the strap through the slot 19, as disclosed in Figure 2, the opposite ends of said strap will occupy the same vertical plane, enabling the strap to exert a uniform pull on the indicator drum. The outer ends of said strap are secured rigidly in any suitable manner and as indicated at 24 to the outer ends of the fingers 17 constituting the yoke, and since said fingers are of a resilient material and are under stress by the manner employed of connecting the strap with the fingers, it follows that said strap will be maintained taut at all times and looseness, slack or undue flexibility therein avoided. The drum 21 is pivotally mounted for rotation about a horizontal axis as at 25 within the tower 16, and connected with one side of said drum is an upstanding pointer 26, the upper end of which being adapted to travel contiguous to a graduated surface 27 disposed in the upper part of the tower 16. This surface is viewable through a transparent panel 28 mounted in said tower.

In view of the foregoing it will be seen that when unequal weights are applied to the opposite ends of the scale beam the arm 15 will be oscillated thereby rocking the yoke formed by the finger 17. Then, since the metallic strap is connected with the hub or drum 21 of the pointer 26 it follows that a very appreciably multiplied movement of the pointer will be effected so far as concerns the degree of travel of the weighing beam. Moreover, this movement is effected without introducing friction to any appreciable extent into the motion transmitting means provided between the beam and the indicator. Another advantage of the construction disclosed resides in the fact that the scale will not be detrimentally affected by variations in temperature, the arrangement of the spring 13 and the resilient finger 17 permitting normal expansion and contraction to take place without changing the positions of the parts associated therewith.

While I have described what I consider to be the preferred form of the present invention, nevertheless, it will be understood that I do not desire to restrict myself to the specific means herein set forth, but reserve the right to employ all such variations and modifications of structure that may be said to fall verily within the scope of the subjoined claims.

What is claimed is:

1. In a scale, in combination, a movable even balanced beam, an arm arising from said beam and fixed to oscillate in unison therewith, a resilient yoke carried by the upper end of said arm, an indicator movably mounted independently of said beam, said indicator being provided with a hub, and a thin metallic strap having its intermediate portion wrapped about said hub and having the opposite ends thereof connected with said resilient yoke.

2. In a scale, an even balanced beam movably carried by said scale, an arm fixed to said beam and rising vertically from the center thereof in alignment with the pivotal mounting of the beam, a yoke including resiliently separable fingers carried in connection with the upper end of said arm, a metallic strap having the opposite ends thereof secured to the ends of said fingers, the central portion of said strap being provided with an elongated slot through which one end of said strap is passed, so that the opposite ends of said strap will occupy longitudinally aligned positions, and an indicator pivotally mounted independently of said beam and provided with a drum around which said strap is passed and secured.

In testimony whereof I affix my signature.

NATHAN A. HALLWOOD.